United States Patent
Gustafsson et al.

(10) Patent No.: US 12,511,845 B2
(45) Date of Patent: Dec. 30, 2025

(54) COMMUNICATION OF SEMANTIC INFORMATION BETWEEN AUGMENTED REALITY COMMUNICATION DEVICES

(71) Applicant: Telefonaktiebolaget LM Ericsson (publ), Stockholm (SE)

(72) Inventors: Harald Gustafsson, Lund (SE); Héctor Caltenco, Oxie (SE); Andreas Kristensson, Södra Sandby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 153 days.

(21) Appl. No.: 18/561,492

(22) PCT Filed: May 19, 2021

(86) PCT No.: PCT/EP2021/063364
§ 371 (c)(1),
(2) Date: Nov. 16, 2023

(87) PCT Pub. No.: WO2022/242857
PCT Pub. Date: Nov. 24, 2022

(65) Prior Publication Data
US 2024/0249480 A1    Jul. 25, 2024

(51) Int. Cl.
*G06F 3/14*    (2006.01)
*G06F 3/01*    (2006.01)
(Continued)

(52) U.S. Cl.
CPC ............ *G06T 19/006* (2013.01); *G06F 3/011* (2013.01); *G06F 3/14* (2013.01); *G06T 2200/24* (2013.01);
(Continued)

(58) Field of Classification Search
CPC ............... G06T 19/006; G06T 2200/24; G06T 2219/024; G06F 3/011; G06F 3/14;
(Continued)

(56) References Cited

U.S. PATENT DOCUMENTS 10,198,871 B1    2/2019   Hariton
2010/0145234 A1*  6/2010   Jang ...................... A61B 5/1113
                                                       600/595
(Continued)

FOREIGN PATENT DOCUMENTS

EP      2891509 A1      7/2015
WO   2018212801 A1   11/2018

OTHER PUBLICATIONS

International Search Report and Written Opinion dated Feb. 14, 2022 for International Application No. PCT/EP2021/063364 filed May 19, 2021; consisting of 13 pages.
(Continued)

*Primary Examiner* — Jitesh Patel
(74) *Attorney, Agent, or Firm* — Weisberg I.P. Law, P.A.

(57) ABSTRACT

Arrangements for extracting semantic information from sensory data. An AR module is in communication with a first AR communication device to be worn by a first user and a second AR communication device to be worn by a second user. The first AR communication device includes a first user interface for displaying a representation of the second user and the second AR communication device includes a second user interface for displaying a representation of the first user. Sensory data of the first user as captured by the first AR communication device is obtained. Semantic information of the first user is extracted from the sensory data by subjecting the sensory data to a semantic classification process. The semantic information is provided towards the second user interface for rendering a representation of the semantic (Continued)

information together with a displayed representation of the first user on the second user interface.

20 Claims, 5 Drawing Sheets

(51) Int. Cl.
*G06T 19/00* (2011.01)
*G06V 20/20* (2022.01)
*G06V 20/00* (2022.01)

(52) U.S. Cl.
CPC ........ *G06T 2219/024* (2013.01); *G06V 20/20* (2022.01); *G06V 20/35* (2022.01)

(58) Field of Classification Search
CPC ... G06F 2203/011; G06F 3/012; G06V 20/20; G06V 20/35
See application file for complete search history.

(56) References Cited

U.S. PATENT DOCUMENTS

| | | |
|---|---|---|
| 2013/0249947 A1 | 9/2013 | Reitan |
| 2014/0125698 A1* | 5/2014 | Latta ................ A63F 13/65 345/633 |
| 2014/0306866 A1 | 10/2014 | Miller et al. |
| 2015/0130836 A1 | 5/2015 | Anderson |
| 2015/0235435 A1 | 8/2015 | Miller et al. |
| 2016/0026253 A1 | 1/2016 | Bradski et al. |
| 2016/0350973 A1* | 12/2016 | Shapira ................ G06F 3/011 |
| 2016/0378861 A1 | 12/2016 | Eledath et al. |
| 2018/0095649 A1 | 4/2018 | Valdivia et al. |
| 2019/0130648 A1 | 5/2019 | Duca et al. |
| 2019/0188895 A1 | 6/2019 | Miller, IV et al. |
| 2019/0220918 A1 | 7/2019 | Koenig |
| 2019/0250934 A1 | 8/2019 | Kim et al. |
| 2019/0356745 A1 | 11/2019 | Rosedale |
| 2019/0385371 A1 | 12/2019 | Joyce et al. |
| 2020/0053318 A1 | 2/2020 | Li et al. |
| 2020/0273230 A1 | 8/2020 | Amitay et al. |
| 2021/0041998 A1 | 2/2021 | Voss |
| 2021/0124747 A1* | 4/2021 | Kizelshteyn ..... H04N 21/44227 |

OTHER PUBLICATIONS

Sherstyuk, A. et al., Virtual Roommates in Multiple Shared Spaces, 2011 IEEE International Symposium on Virtual Reality Innovation, Singapore, Mar. 19-20, 2011, consisting of 8 pages.

Jo, D. et al., Avatar Motion Adaptation for AR Based 3D Tele-Conference, International Workshop on Collaborative Virtual Environments (3DCVE), Minneapolis, MN, USA, Mar. 30, 2014, consisting of 4 pages.

Khan, M. S. L., et al., Action Augmented Real Virtuality: A Design for Presence, IEEE Transactions on Cognitive and Developmental Systems, vol. 10, No. 4, Dec. 2018, consisting of 12 pages.

Nguyen, H.T., et al., Path planning and Obstacle avoidance approaches for Mobile robot, IJCSI International Journal of Computer Science Issues, vol. 13, Issue 4, Jul. 2016, consisting of 10 pages.

Tanaka, K., et al., Obstacle Avoidance of Welfare Vehicle with Head Mounted Display using Spatial Mapping of Driving Environment, 2019 19th International Conference on Control, Automation and Systems (ICCAS 2019), Jeju, South Korea, Oct. 15-18, 2019, consisting of 6 pages.

Salomon, B., et al., Interactive Navigation in Complex Environments Using Path Planning, Proceedings of the 2003 Symposium on Interactive 3D Graphics, Apr. 27, 2003, consisting of 10 pages.

Jording, M., et al., Inferring Interactivity From Gaze Patterns During Triadic Person-Object-Agent Interactions, Frontiers in Psychology, vol. 10, Article 1913, Aug. 21, 2019, consisting of 11 pages.

Turnwald, A., et al., Human-Like Motion Planning Based on Game Theoretic Decision Making, International Journal of Social Robotics, vol. 11, Jul. 11, 2018, consisting of 20 pages.

Hickson, S. et al., Eyemotion: Classifying facial expressions in VR using eye-tracking cameras, 2019 IEEE Winter Conference on Applications of Computer Vision (WACV), Waikoloa, HI, USA, 2019, consisting of 10 pages.

Tome, D., et al., xR-EgoPose: Egocentric 3D Human Pose from an HMD Camera, 2019 IEEE/CVF International Conference on Computer Vision (ICCV), Jul. 2019, consisting of 11 pages.

Boyain, C.E., et al., Autonomous Motion Planning for Avatar Limbs, Computacion y Sistemas, vol. 19, No. 3, 2015, consisting of 10 pages.

Murakami, M., et al., AffectiveHMD: Facial Expression Recognition in Head Mounted Display Using Embedded Photo Reflective Sensors, Association for Computing Machinery, Inc., Jul. 28, 2019, consisting of 2 pages.

International Search Report and Written Opinion dated Feb. 11, 2022 for International Application No. PCT/EP2021/063363 filed May 19, 2021; consisting of 10 pages.

Yoon, B., et al., The Effect of Avatar Appearance on Social Presence in an Augmented Reality Remote Collaboration, 2019 IEEE Conference on Virtual Reality and 3D User Interfaces (VR), Osaka, Japan, Mar. 23-27, 2019, pp. 547-556, consisting of 10 pages.

wikipedia.com, Picture-in-Picture, first information retrieved May 18, 2008, printed on Dec. 8, 2020, consisting of 2 pages.

* cited by examiner (a)

(b)

(c)

(d)

ized to the users' likings. With semantic AR communication, the representation of each user in the AR application is semantically adapted to the environment where it is rendered. That is, the representation of

COMMUNICATION OF SEMANTIC INFORMATION BETWEEN AUGMENTED REALITY COMMUNICATION DEVICES

CROSS-REFERENCE TO RELATED APPLICATION

This application is a Submission Under 35 U.S.C. § 371 for U.S. National Stage Patent Application of International Application Number: PCT/EP2021/063364, filed May 19, 2021 entitled "COMMUNICATION OF SEMANTIC INFORMATION BETWEEN AUGMENTED REALITY COMMUNICATION DEVICES," the entirety of which is incorporated herein by reference.

TECHNICAL FIELD

Embodiments presented herein relate to a method, an augmented reality module, a computer program, and a computer program product for extracting semantic information from sensory data.

BACKGROUND

In general terms, augmented reality (AR) is an interactive experience of a real-world environment where the objects that reside in the real world are enhanced by computer-generated perceptual information, sometimes across multiple sensory modalities, including visual, auditory, haptic, somatosensory and olfactory. AR can be defined as a system that incorporates a combination of real and virtual worlds, real-time interaction, and accurate three-dimensional (3D) registration of virtual and real objects. The overlaid sensory information can be constructive (i.e. additive to the natural environment), or destructive (i.e. masking of the natural environment). AR communication devices, such smart glasses or wearable computer glasses, enable users to interact with each other using AR applications.

In computer vision, semantic scene understanding attempts to contextually analyze objects with the spatial structure of the scene as well as the spatial, functional and semantic relationships between the objects and the environment. With spatial and semantic understanding, object detection, 3D reconstruction, and spatial reasoning are combined to enable understanding of a scene in higher level.

Attempts have been made to integrate semantic information with AR applications, such that users are semantically integrated in each other's environments. As an example, when avatars are used in AR applications their appearance can typically be customized to the users' likings. With semantic AR communication, the representation of each user in the AR application is semantically adapted to the environment where it is rendered. That is, the representation of a first user as rendered in an AR application at a second user is adapted to the environment of the second user, and vice versa. This requires semantic information to be transferred or communicated, between the AR communication devices.

However, there is still a need for an improved communication of semantic information between AR communication devices.

SUMMARY

An object of embodiments herein is to provide efficient communication of semantic information between AR communication devices.

According to a first aspect there is presented a method for extracting semantic information from sensory data. The method is performed by an AR module. The AR module is in communication with a first AR communication device to be worn by a first user and a second AR communication device to be worn by a second user. The first AR communication device comprises a first user interface for displaying a representation of the second user and the second AR communication device comprises a second user interface for displaying a representation of the first user. The method comprises obtaining sensory data of the first user as captured by the first AR communication device. The method comprises extracting semantic information of the first user from the sensory data by subjecting the sensory data to a semantic classification process. The method comprises providing the semantic information towards the second user interface for rendering a representation of the semantic information together with a displayed representation of the first user on the second user interface.

According to a second aspect there is presented an AR module for extracting semantic information from sensory data. The AR module is configured to be in communication with a first AR communication device to be worn by a first user and a second AR communication device to be worn by a second user. The first AR communication device comprises a first user interface for displaying a representation of the second user and the second AR communication device comprises a second user interface for displaying a representation of the first user. The AR module comprises processing circuitry. The processing circuitry is configured to cause the AR module to obtain sensory data of the first user as captured by the first AR communication device. The processing circuitry is configured to cause the AR module to extract semantic information of the first user from the sensory data by subjecting the sensory data to a semantic classification process. The processing circuitry is configured to cause the AR module to provide the semantic information towards the second user interface for rendering a representation of the semantic information together with a displayed representation of the first user on the second user interface.

According to a third aspect there is presented an AR module for extracting semantic information from sensory data. The AR module is configured to be in communication with a first AR communication device to be worn by a first user and a second AR communication device to be worn by a second user. The first AR communication device comprises a first user interface for displaying a representation of the second user and the second AR communication device comprises a second user interface for displaying a representation of the first user. The AR module comprises an obtain module configured to obtain sensory data of the first user as captured by the first AR communication device. The AR module comprises an extract module configured to extract semantic information of the first user from the sensory data by subjecting the sensory data to a semantic classification process. The AR module comprises a provide module configured to provide the semantic information towards the second user interface for rendering a representation of the semantic information together with a displayed representation of the first user on the second user interface.

According to a fourth aspect there is presented a computer program for extracting semantic information from sensory data, the computer program comprising computer program code which, when run on an AR module, causes the AR module to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects enable efficient communication of semantic information between AR communication devices.

Advantageously, these aspects enable the second user to know how the representation of the second user is displayed at the first user interface.

Advantageously, these aspects enable the second user 130b to gain information of the remote environment of the first user.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
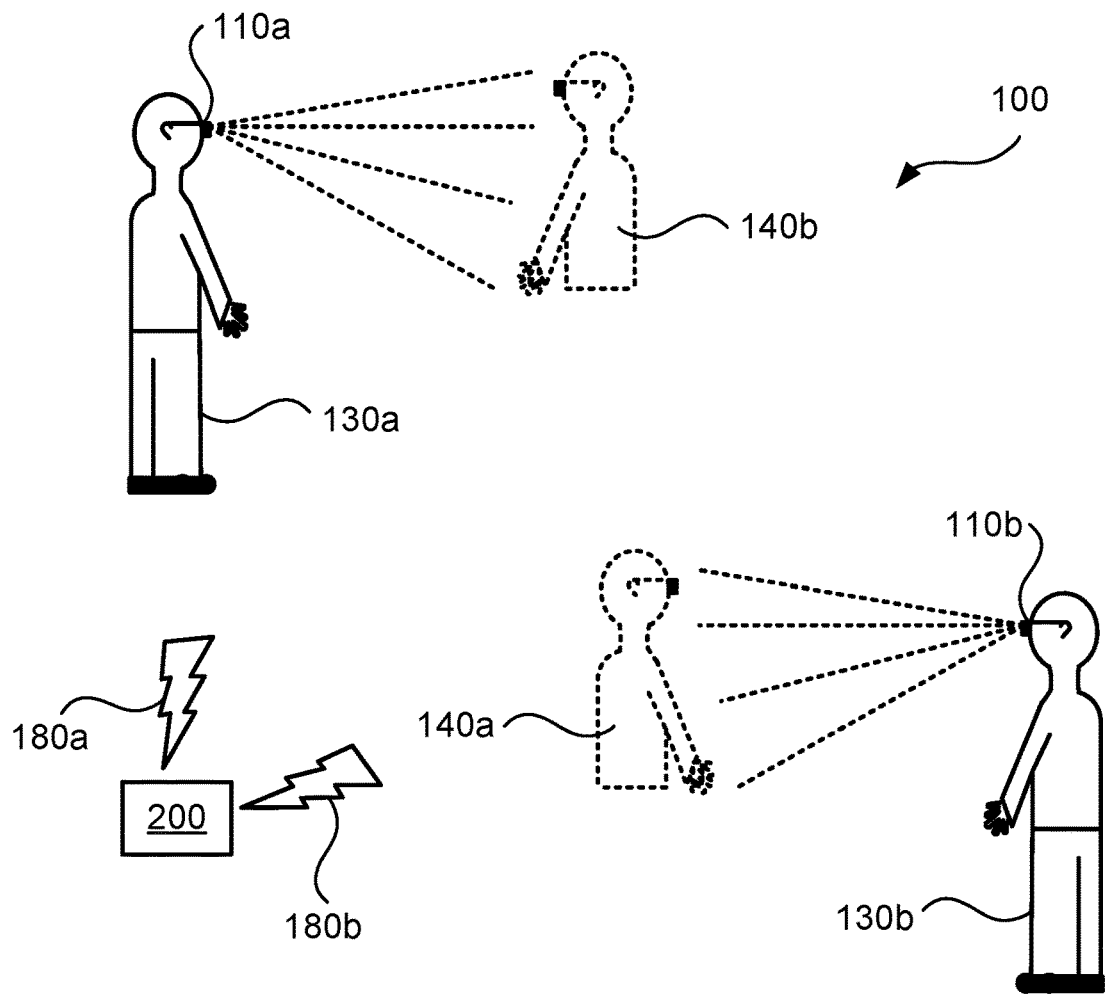
FIG. 1 is a schematic diagram illustrating an AR communication system according to an embodiment.

FIG. 1 is a schematic diagram illustrating an AR communication system 100 where embodiments presented herein can be applied. The AR communication system 100 comprises two AR communication devices 110a, 110b and an AR module 200. As schematically illustrated at 180a, 180b, the AR module 200 is configured to communicate with the AR communication devices 110a, 110b.

Figure 2:
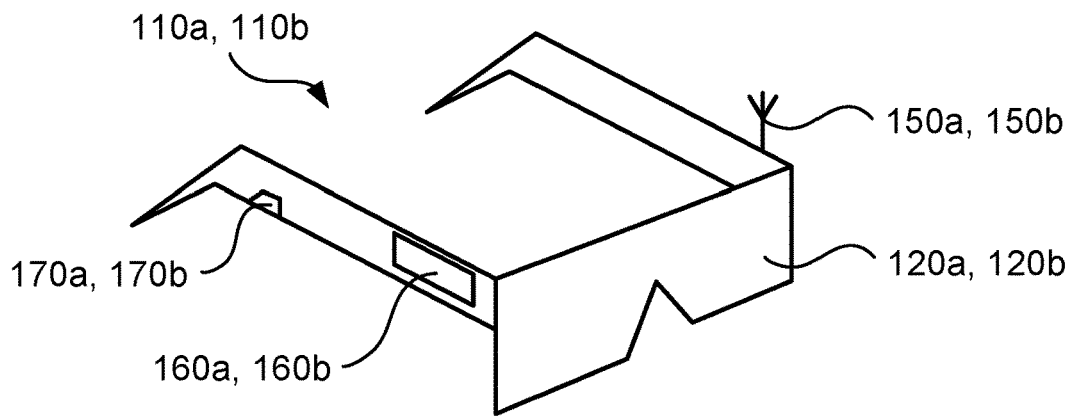
FIG. 2 schematically illustrates an AR communication device according to an embodiment.

As will be further disclosed with reference to FIG. 2, each AR communication device 110a, 110b comprises a respective user interface. Each AR communication device 110a, 110b is intended to be worn by a respective user 130a, 130b. For notation purposes and without imposing any hierarchical relationship among the AR communication devices 110a, 110b, AR communication device 110a is hereinafter denoted a first AR communication device 110a, whereas AR communication device 110b is hereinafter denoted a second AR communication device 110b. The first AR communication device 110a comprises a first user interface 120a for displaying a representation 140b of the second user 130b. The second AR communication device 110b comprises a second user interface 120b for displaying a representation 140a of the first user 130a. Further, as is appreciated by the skilled person, the AR communication system 100 might comprise a plurality of AR communication devices, each having its own user interface, and each being configured for communication with the other AR communication devices.

There could be different types of AR communication devices 110a, 110b. FIG. 2 schematically illustrates an example where the AR communication devices 110a, 110b are provided as a head-mountable display taking the shape of a pair of glasses.

In the illustrative example of FIG. 2, the AR communication device 110a, 110b comprises a user interface 120a, 120b for displaying a representation of the users as well as for displaying other information. The AR communication device 110a, 110b further comprises a communication interface 150a, 150b for communicating with another AR communication device 110a, 110b and with the AR module 200. Although illustrated as an antenna, the communication interface 150a, 150b might be a wired communication interface, and infrared communication interface, or some other kind of communication interface. In this respect, the AR communication device 110a, 110b might be configured for direct communication with each other or for communicating with each other via at least one other device, such as a mobile phone, personal computer, gaming machine, or the like. The AR communication device 110a, 110b further comprises a local controller 160a, 160b for controlling operation of the AR communication device 110a, 110b. The local controller 160a, 160b might be provided as processing circuitry. In this respect, although illustrated as a separate device in FIG. 1, the AR module 200 might equally be implemented partly or fully by the controller 160a, 160b in at least one of the AR communication devices 110a, 110b. In the example of FIG. 2, the AR communication device 110a, 110b further comprises a speaker and/or microphone 170a, 170b or other type of audio playing or recording device. Audio recorded at one AR communication device 110a, 110b can be transferred to be played out at another AR communication device 110a, 110b via the communication interface 150a, 150b.

As noted above there is still a need for an improved communication of semantic information between AR communication devices. This could result in that the second user 130b does not know how the representation 140b of the second user 130b is displayed at the first user interface 120a. Further, the second user 130b might lack information of the remote environment of the first user 130a since the representation 140a of the first user 130a as displayed at the second user interface 120b is adapted to the environment of the second user 130b.

The embodiments disclosed herein therefore relate to mechanisms for extracting semantic information from sensory data. In order to obtain such mechanisms there is provided an AR module 200, a method performed by the AR module 200, a computer program product comprising code, for example in the form of a computer program, that when run on an AR module 200, causes the AR module 200 to perform the method.

Figure 3:
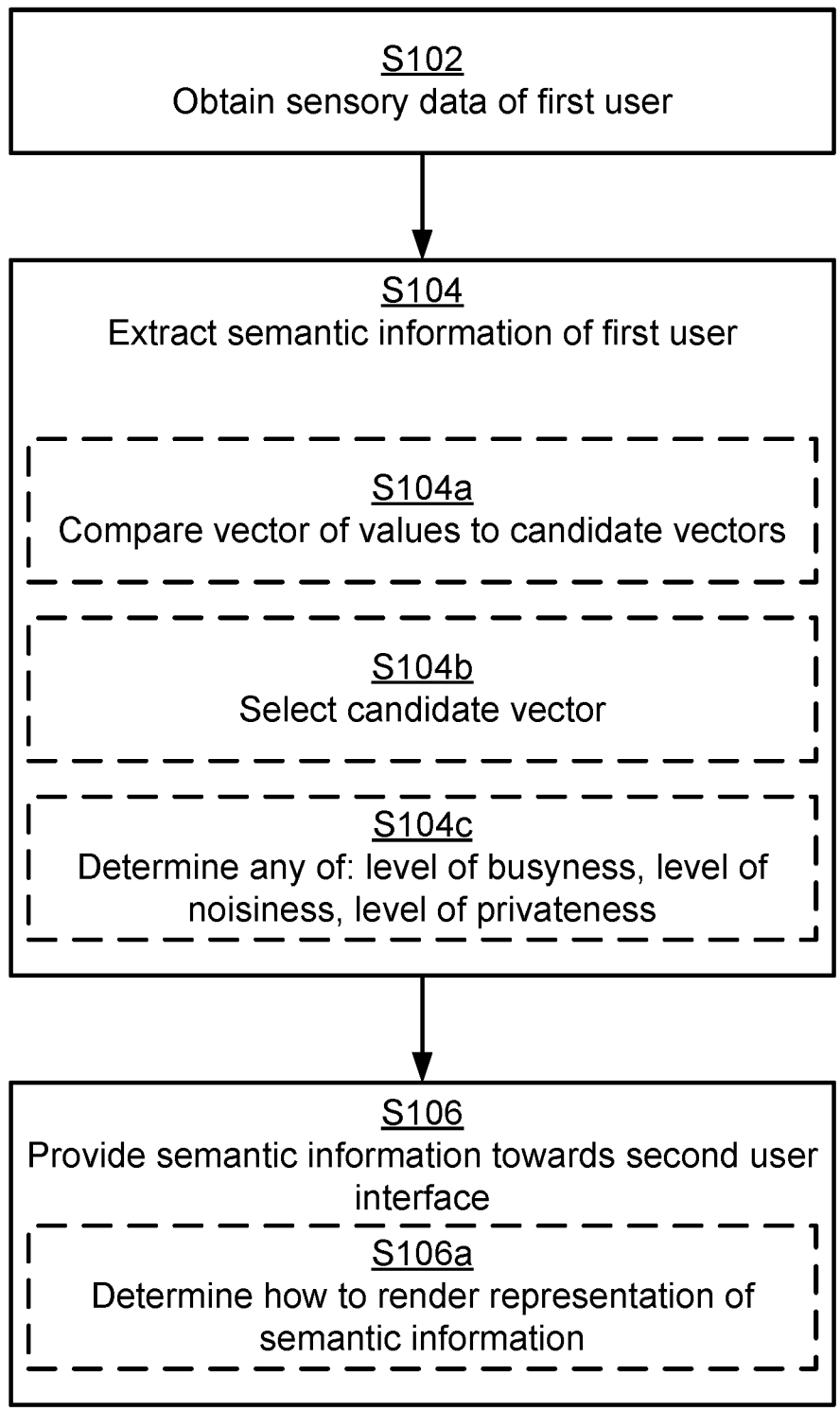
FIG. 3 is a flowchart of methods according to embodiments.

FIG. 3 is a flowchart illustrating embodiments of methods for extracting semantic information from sensory data. The methods are performed by the AR module 200. The methods are advantageously provided as computer programs 820. The AR module 200 is configured to be in communication with a first AR communication device 110a to be worn by a first user 130a and a second AR communication device 110b to be worn by a second user 130b. As illustrated in FIG. 1, the first AR communication device 110a comprises a first user interface 120a for displaying a representation 140b of the second user 130b and the second AR communication device 110b comprises a second user interface 120b for displaying a representation 140a of the first user 130a.

S102: The AR module 200 obtains sensory data of the first user 130a as captured by the first AR communication device 110a.

S104: The AR module 200 extracts semantic information of the first user 130a from the sensory data by subjecting the sensory data to a semantic classification process.

S106: The AR module 200 provides the semantic information towards the second user interface 120b for rendering a representation of the semantic information together with a displayed representation 140a of the first user 130a on the second user interface 120b.

This method enables semantic information that to the second user 130b indicate the environment of the first user 130a. This method can be used in combination with methods according to which semantic information of the first user 130a is adapted to semantic information of the second user 130b for rendering the representation 140a of the first user 130a on the second user interface 120b.

Aspects relating to further details of extracting semantic information from sensory data as performed by the AR module 200 will now be disclosed.

There may be different examples of sensory data. In some non-limiting examples, the sensory data comprises values of parameters where the parameters representing any of: gesture of the first user 130a, pose of the first user 130a, motion of the first user 130a, activity of the first user 130a, physical environment of the first user 130a, crowdedness of the physical environment, sound level in vicinity of the first user 130a, physical location of the first user 130a, environmental classification of the physical location of the first user 130a, or any combination thereof.

In further detail, the first AR communication device 110a might be provided with sensors or a communication interface for receiving sensory data. As an example, sensory data might be obtained by a camera that is either part of, attached to, or in communication with, the first AR communication device 110a. In this way the first AR communication device 110a can obtain information of its environment and thus the environment of the first user 130a. Localization (and optionally, mapping processes, such as SLAM) can be run on the first AR communication device 110a to obtain spatial information of the environment. Image data from the camera, as well as sensory data from other sensors and location-services or infrastructure sensors can also be used to define the semantic information. For example, sensory data can be obtained to determine if the first user 130a is indoors, outdoors, whether it is day or night, the current temperature, the current weather, the current noise level, whether the first user 130a is in a crowded environment or is alone, etc.

Aspects relating to further details of subjecting the sensory data to a semantic classification process will now be disclosed.

As disclosed above, the sensory data is subjected to a semantic classification process. The semantic classification process can be used to, from classes of possible semantic activities and/or environments, determine which such class is most suitable. Such classification can be used to determine the likeliest category of the semantic activity characteristics.

In some aspects, the sensory data comprises values of parameters and is represented by a vector of the values. Such a representation can be useful for classification of the sensory data. Machine learning models, e.g. a deep neural network classifier, can be trained to detect the likeliest category, or class, of semantic activity being performed by the first user 130a (e.g., eating, walking, sitting, running, laying down, etc.). This will allow for inference of semantic activity and/or environment characteristics. These models can be trained with supervised learning based on training vectors of sensory data and a set of categories. For example, existing sets of data, that could represent training vectors of sensory data, could be used for activity detection. The training data can be provided online from the AR communication devices 110a, 100b and by requesting the AR communication devices 110a, 100b to label the training data with a label from a set of categories.

In some embodiments, the AR module 200 is configured to perform (optional) steps S104a and S104b as part of subjecting the sensory data to the semantic classification in step S104:

S104a: The AR module 200 compares the vector of the values to candidate vectors, wherein each of the candidate vectors represents a respective class of semantic information.

S104b: The AR module 200 selects the candidate vector that, according to a distance criterion, best matches the vector of the values.

The semantic information of the user is then a function of the class of semantic information of the selected candidate vector.

Aspects relating to further details of whether the first user 130a is in a crowded environment or is alone, etc. will now be disclosed.

In some embodiments, the AR module 200 is configured to perform (optional) step S104c as part of subjecting the sensory data to the semantic classification in step S104:

S104c: The AR module 200 determines, from the vector of the values, any of: level of busyness of the first user 130a, level of noisiness of the first user 130a, level of privateness of the first user 130a, or any combination thereof.

The semantic information of the user further is then a function of any of: the level of busyness of the first user 130a, the level of noisiness of the first user 130a, the level of privateness of the first user 130a, or any combination thereof.

In this respect, machine learning models, e.g. a deep neural network classifier, can be used to determine a probability value of certain environment characteristics. Non-limiting examples of such environment characteristics are: if there are any pieces of furniture, such as tables or chairs in the vicinity of the first user 130a, how many other users, or persons, there are in the vicinity of the first user 130a, etc.

Such environment characteristics can then be used to define the environment of the first user 130a along a scale from busy/noisy/public to calm/alone/private. The machine learning models can be trained with supervised training based on the above-mentioned examples of the sensory data a probability of each condition. For example, existing sets of data, that could represent training vectors of sensory data, could be used for detection any of the conditions (from busy/noisy/public to calm/alone/private). The training data can be provided online from the AR communication devices 110a, 100b and by requesting the AR communication devices 110a, 100b to label the training data with a probability value for each of the conditions (from busy/noisy/public to calm/alone/private).

In some embodiments, the displayed representation 140a of the first user 130a is rendered based on a model of the first user 130a, and the model is a function of parameters, where the values of the model are obtained at the first AR communication device 110a. In this respect, the model of the of the first user 130a can be a pre-defined avatar or a pre-scanned 3D model of the first user 130a itself. The avatar could be available as a renderable and interactive 3D object. The model can be stored in the first AR communication device 110a and be defined by the first user 130a from a list of available models, or it can be stored at the first AR communication device 110a and shared as metadata during an initial handshakes between the first AR communication device 110a and the second AR communication device 110b. The model can be simplified by only having knee and waist joint with the attached shin, thigh and upper body. Alternatively, a full model is used when available.

Aspects of information transfer between the first communication device 110a and the second communication device 110b will now be disclosed.

While any of the users 130a, 130b has not paused communication between the AR communication devices 110a, 100b, the information needed for rendering at the first user interface 120a, might be transferred to be readily available at the second user interface 120b. This information could be shared via a cloud service for the application or as a peer-to-peer application.

Once the information has been successfully transferred, the information can be used for rendering a representation of the semantic information together with the displayed representation 140a of the first user 130a on the second user interface 120b.

In some non-limiting examples, the representation of the semantic information is any of: a graphical representation, a textual representation, or any combination thereof. In some non-limiting examples, the representation of the semantic information is rendered on or beside the displayed representation 140a of the first user 130a. Hence, the semantic information can be represented graphically and/or textually and be displayed e.g. as texture on the displayed representation 140a of the first user 130a or next to the displayed representation 140a of the first user 130a as e.g. text or an icon. If no information is available, a default or a null category can be assigned. This provides feedback to the second user 130b regarding the category of semantic activity at the side of the first user 130a. In some embodiments, the displayed representation 140a of the first user 130a is an avatar, such as a three-dimensional avatar.

In some aspects, the AR module 200 determines how the representation of the semantic information is to be rendered. In particular, in some embodiments, the AR module 200 is configured to perform (optional) step S106a:

S106a: The AR module 200 determines, based on physical properties, such as size, pixel resolution, processing capability, etc., of the second user interface 120b, how much other information is to be displayed at the second user interface 120b, or user input from the second user 130b, whether to render the representation of the semantic information as the graphical representation, the textual representation, or the combination thereof, and/or whether to render the representation of the semantic information on or beside the displayed representation 140a of the first user 130a.

Additionally, information on the virtual distance between the first user 130a and the second user 130b and the direction between first user 130a and the second user 130b at the first user 130a could be displayed at the second user 130b, e.g. by an icon or graphics showing a direction and length proportional to the distance (in linear or non-linear scale). Since this icon or graphics can be shown in using AR, the icon or graphics could be rendered as a horizontal disc centered at the second user 130b and e.g. at floor level. The second user 130b understands therefore the visualized relative position of its own displayed representation 140b in relation to the displayed representation 140a of the first user 130a. This enables manual adapting so when the users 130a, 130b want, they can arrange their environments to match. For example, when both users 130a, 130b are walking, they can arrange so that the respective representation is at the equivalent physical relative position. This would then require fewer modeling adaptations of the displayed representations 140a, 140b and hence likely give better appearance and user experience.

In some aspects, feedback is provided regarding how the second user 130a itself is represented at the user interface 120a of the first user 130a. Particularly, in some embodiments, the second user interface 120b is configured also for displaying the representation 140b of the second user 130b, and the representation 140b of the second user 130b is rendered based on the semantic information of the first user 130a. Hence, graphics, an icon, or text information might be rendered that represents the pose of the avatar of the second user 130b as it is rendered on the user interface 120a of the first user 130a. If no information is available, a default pose can be assigned.

There might be cases where semantic information of the first user 130a cannot be provided towards the second AR communication device 110b. One example of this is when sensory data of the first user 130a cannot be obtained (for example, by the first user 130a having disabled, or paused, the capturing of sensory data at the first AR communication device 110a). Another example of this is when there is a disturbance in the communication for providing the semantic information towards the second AR communication device 110b. In such cases, rendering of a representation the lastly provided semantic information can continue (until a timer expires, where the timer started upon detection that semantic information of the first user 130a cannot be provided towards the second AR communication device 110b).

Figure 4:
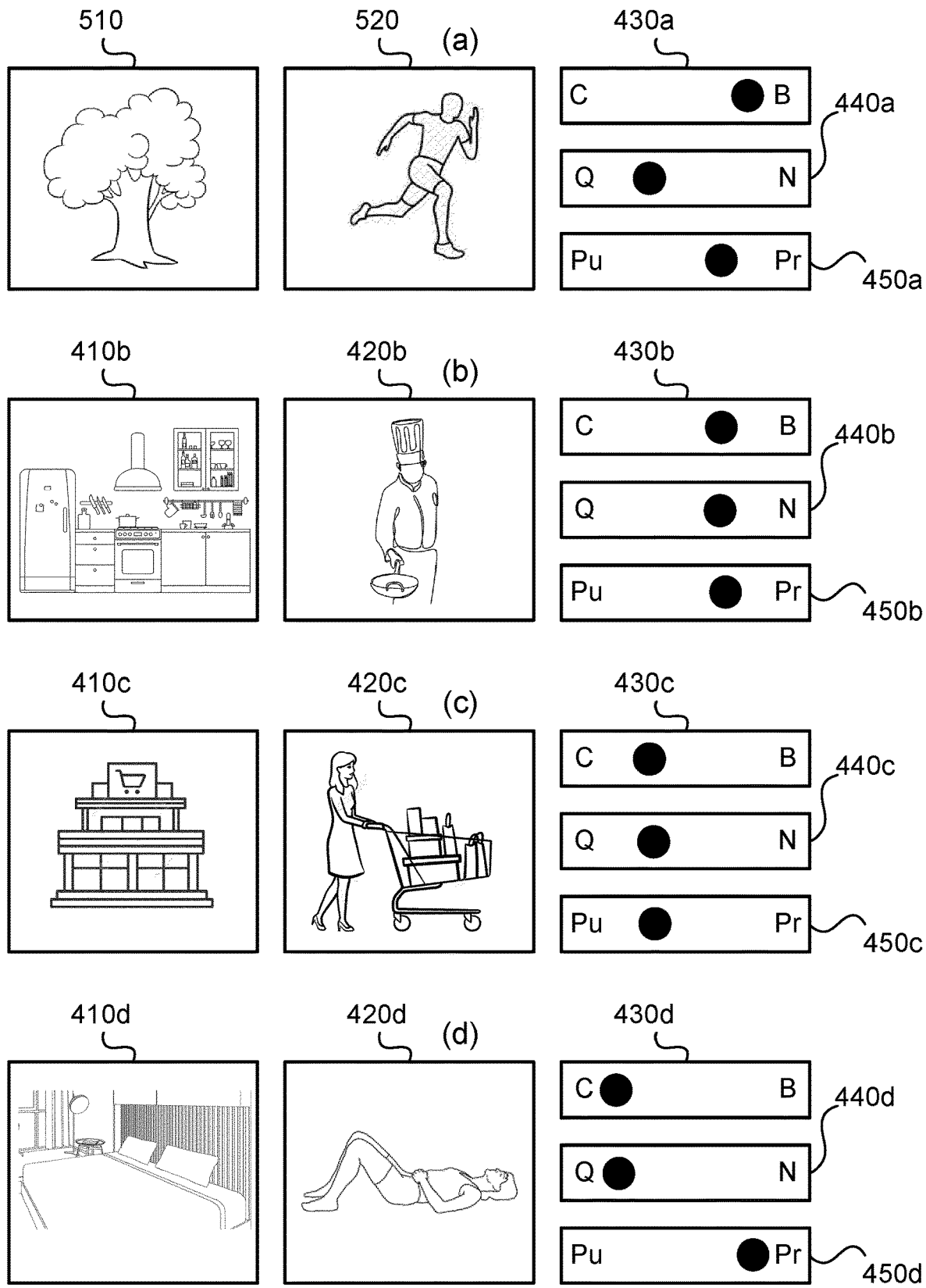
FIGS. 4 and 5 schematically illustrates rendering of representations of semantic information according to embodiments.

FIG. 4 illustrates at (a), (b), (c), (d) four different examples of how the representation of the semantic information can be rendered. In all four cases, the following types of semantic information are provided; the location of the first user 130a (as illustrated at 410a, 410b, 410c, 410d), the activity of the first user 130a (as illustrated at 420a, 420b, 420c, 420d), the level of busyness of the first user 130a (as illustrated at 430a, 430b, 430c, 430d by a black dot on a scale from "calm" (C) to "busy" (B)), the level of noisiness of the first user 130a (as illustrated at 440a, 440b, 440c,

440d by a black dot on a scale from "quiet" (Q) to "noisy" (N)), and level of privateness of the first user 130a (as illustrated at 450a, 450b, 450c, 450d by a black dot on a scale from "public" (Pu) to "private" (Pr)).

A first example in FIG. 4(*a*) illustrates a scenario where the first user 130a is located in a "forest", where the first user 130a is "running", where the level of busyness of the first user 130a is "busy", where the level of noisiness of the first user 130a is mostly "quiet", where level of privateness of the first user 130a is mostly "private".

A second example in FIG. 4(*b*) illustrates a scenario where the first user 130a is located in a "kitchen", where the first user 130a is "cooking", where the level of busyness of the first user 130a is mostly "busy", where the level of noisiness of the first user 130a is mostly "noisy", where level of privateness of the first user 130a is mostly "private".

A third example in FIG. 4(*c*) illustrates a scenario where the first user 130a is located in a "shop", where the activity of the first user 130a is "walking", where the level of busyness of the first user 130a is mostly "calm", where the level of noisiness of the first user 130a is mostly "quiet", where level of privateness of the first user 130a is mostly "public".

A fourth example in FIG. 4(*d*) illustrates a scenario where the first user 130a is located in a "bedroom", where the activity of the first user 130a is "laying down", where the level of busyness of the first user 130a is "calm", where the level of noisiness of the first user 130a is "quiet", where level of privateness of the first user 130a is "private".

Figure 5:
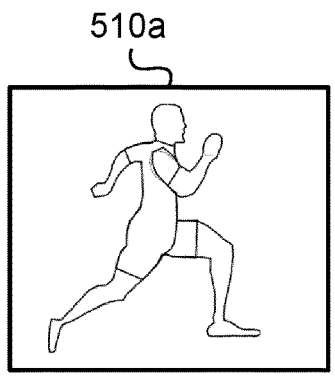
Figure 5:
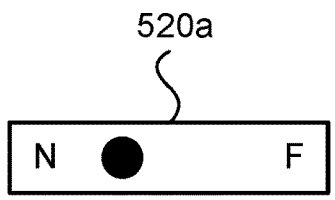
Figure 5:
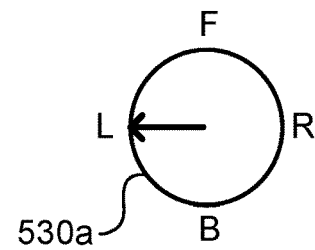
Figure 5:
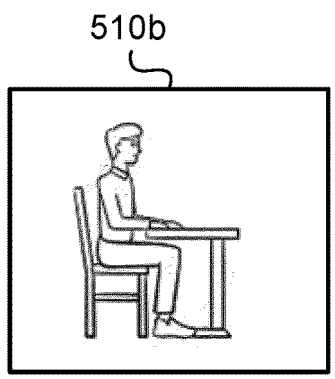
Figure 5:
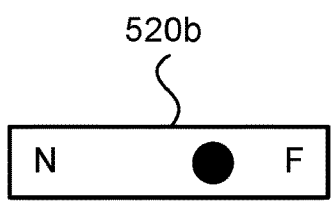
Figure 5:
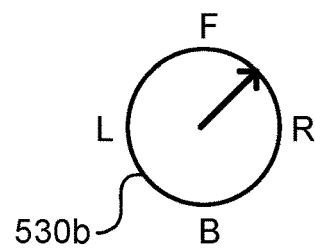
Figure 5:
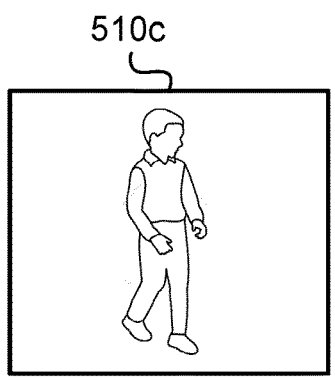
Figure 5:
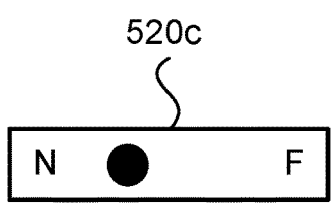
Figure 5:
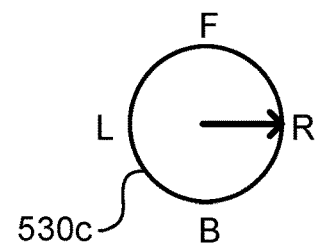
Figure 5:
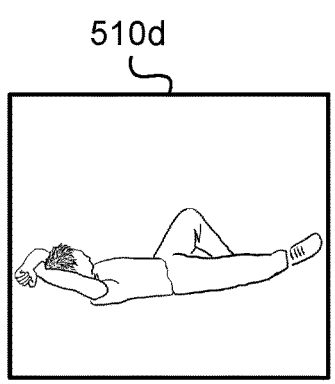
Figure 5:
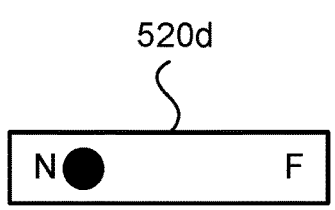
Figure 5:
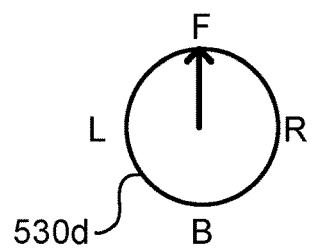

FIG. 5 illustrates at (a), (b), (c), (d) four different examples of feedback information relating to how the representation 140b of the second user 130b as displayed on the first user interface 120a can be provided to the second user 130b. The four examples in FIG. 5 correspond to the four examples in FIG. 4 and can thus be regarded as an extension of FIG. 4. That is, FIG. 4(*a*) could be combined with FIG. 5(*a*), and so on. In all four cases, the following types of feedback information is provided; the activity of the second user 130b (as illustrated at 510a, 510b, 510c, 510d), the distance to the first user 130a (as illustrated at 520a, 520b, 520c, 520d by a black dot on a scale from "Near" (N) to "Far" (F)), and the direction to the first user 130a (as illustrated at 530a, 530b, 530c, 530d by an arrow in a circle labelled with the directions "Left" (L), "Right" (R), "In Front" (F), and "Behind" (B)).

A first example in FIG. 5(*a*) illustrates a scenario where the representation 140b of the second user 130b is displayed as "running" along the first user 130a, where the representation 140b of the second user 130b is displayed is mostly "near" the first user 130a, and where the representation 140b of the second user 130b is displayed to the "left" of the first user 130a at the first user interface 130a.

A second example in FIG. 5(*b*) illustrates a scenario where the representation 140b of the second user 130b is displayed as "sitting" in front of the first user 130a, where the representation 140b of the second user 130b is displayed is mostly "far" from the first user 130a, and where the representation 140b of the second user 130b is displayed to the "front/right" of the first user 130a at the first user interface 130a.

A third example in FIG. 5(*c*) illustrates a scenario where the representation 140b of the second user 130b is displayed as "walking" next to the first user 130a, where the representation 140b of the second user 130b is displayed is mostly "near" the first user 130a, and where the representation 140b of the second user 130b is displayed to the "right" of the first user 130a at the first user interface 130a.

A fourth example in FIG. 5(*d*) illustrates a scenario where the representation 140b of the second user 130b is displayed as "laying" next to the first user 130a, where the representation 140b of the second user 130b is displayed is "near" the first user 130a, and where the representation 140b of the second user 130b is displayed to the "front" of the first user 130a at the first user interface 130a.

As the skilled person understands, the illustrations in FIGS. 4 and 5 are only schematic. The representation of the semantic information can be rendered in other ways than illustrated in FIG. 4 and the feedback information can be provided in other ways than illustrated in FIG. 5. For example, although some of the information has been illustrated as taking a value along a bar (e.g., the level of busyness of the first user 130a being illustrated by a black dot on a scale from "calm" (C) to "busy" (B)), the information can be illustrated also in different ways. As further noted above, the content of FIGS. 4 and 5 could be combined.

Figure 6:
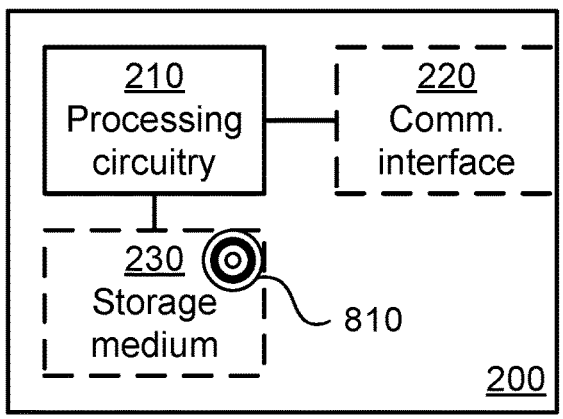
FIG. 6 is a schematic diagram showing functional units of an AR module according to an embodiment.

FIG. 6 schematically illustrates, in terms of a number of functional units, the components of an AR module 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the AR module 200 to perform a set of operations, or steps, as disclosed above. For example, the storage medium 230 may store the set of operations, and the processing circuitry 210 may be configured to retrieve the set of operations from the storage medium 230 to cause the AR module 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The AR module 200 may further comprise a communications interface 220 at least configured for communications with other entities, functions, nodes, devices, and modules, such as the AR communication devices 110a, 110b. As such the communications interface 220 may comprise one or more transmitters and receivers, comprising analogue and digital components. The processing circuitry 210 controls the general operation of the AR module 200 e.g. by sending data and control signals to the communications interface 220 and the storage medium 230, by receiving data and reports from the communications interface 220, and by retrieving data and instructions from the storage medium 230. Other components, as well as the related functionality, of the AR module 200 are omitted in order not to obscure the concepts presented herein.

Figure 7:
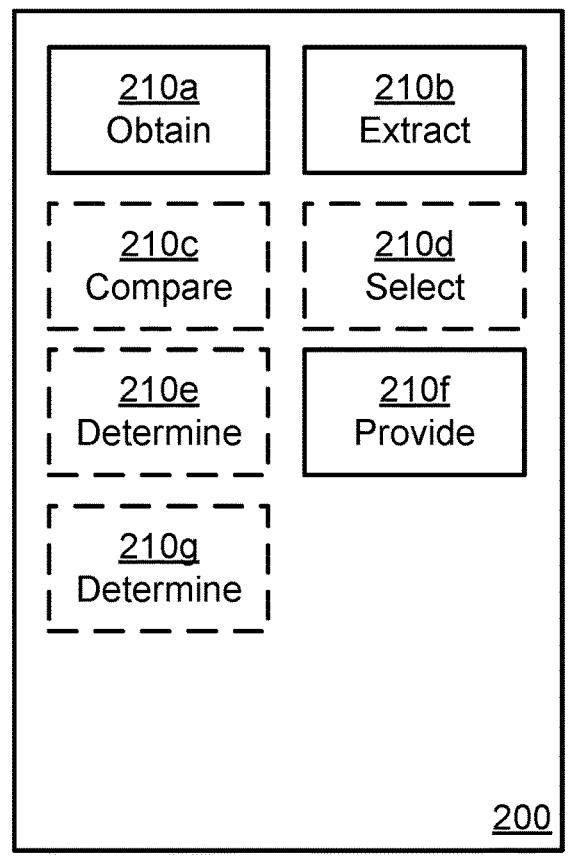
FIG. 7 is a schematic diagram showing functional modules of an AR module according to an embodiment.

FIG. 7 schematically illustrates, in terms of a number of functional modules, the components of an AR module 200 according to an embodiment. The AR module 200 of FIG. 7 comprises a number of functional modules; an obtain module 210a configured to perform step S102, an extract module 210b configured to perform step S104, and a provide module 210f configured to perform step S106. The AR module 200 of FIG. 7 may further comprise a number of optional functional modules, such as any of a compare module 210c configured to perform step S104a, a select module 210d configured to perform step S104b, a determine module 210e configured to perform step S104c, and a determine module 210g configured to perform step S106a. In general terms, each functional module 210a:210g may in one embodiment be implemented only in hardware and in another embodiment with the help of software, i.e., the latter embodiment having computer program instructions stored on the storage medium 230 which when run on the processing circuitry makes the AR module 200 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a:210g may be implemented by the processing circuitry 210, possibly in cooperation with the communications interface 220 and/or the storage medium 230. The processing circuitry 210 may thus be configured to from the storage medium 230 fetch instructions as provided by a functional module 210a:210g and to execute these instructions, thereby performing any steps as disclosed herein.

The AR module 200 may be provided as a standalone device or as a part of at least one further device. Alternatively, functionality of the AR module 200 may be distributed between at least two devices, or nodes. These at least two nodes, or devices, may either be part of the same network part (such as a radio access network or a core network) or may be spread between at least two such network parts. Thus, a first portion of the instructions performed by the AR module 200 may be executed in a first device, and a second portion of the of the instructions performed by the AR module 200 may be executed in a second device; the herein disclosed embodiments are not limited to any particular number of devices on which the instructions performed by the AR module 200 may be executed. Hence, the methods according to the herein disclosed embodiments are suitable to be performed by an AR module 200 residing in a cloud computational environment. Therefore, although a single processing circuitry 210 is illustrated in FIG. 6 the processing circuitry 210 may be distributed among a plurality of devices, or nodes. The same applies to the functional modules 210a:210g of FIG. 7 and the computer program 820 of FIG. 8.

Figure 8:
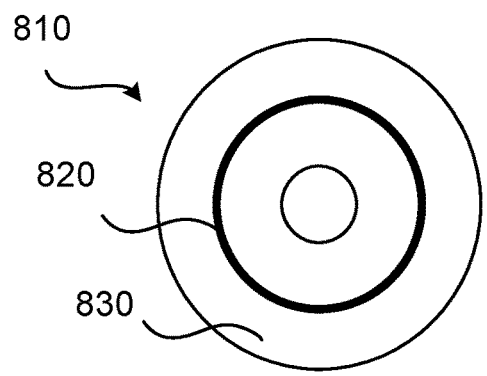
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for extracting semantic information from sensory data, the method being performed by an Augmented Reality, AR, module, the AR module being in communication with a first AR communication device to be worn by a first user and a second AR communication device to be worn by a second user, the first AR communication device comprising a first user interface for displaying a representation of the second user and the second AR communication device comprising a second user interface for displaying a representation of the first user, the method comprising:
    obtaining sensory data of the first user as captured by the first AR communication device, the sensory data comprising values of parameters and being represented by a vector of the values;
    determining, from the vector of the values, one or both of level of noisiness of the first user and level of privateness of the first user;
    extracting semantic information of the first user from the sensory data by subjecting the sensory data to a semantic classification process, the semantic information of the user further being a function of one or both of the level of noisiness of the first user and the level of privateness of the first user; and
    providing the semantic information towards the second user interface for rendering a representation of the semantic information together with a displayed representation of the first user on the second user interface.

2. The method according to claim 1, wherein the sensory data comprises values of parameters, the parameters representing any of: gesture of the first user, pose of the first user, motion of the first user, activity of the first user, physical environment of the first user, crowdedness of the physical environment, sound level in vicinity of the first user, physical location of the first user, environmental classification of the physical location of the first user, or any combination thereof.

3. The method according to claim 1, wherein the sensory data comprises values of parameters and is represented by a vector of the values, and wherein the semantic classification process comprises:
    comparing the vector of the values to candidate vectors, wherein each of the candidate vectors represents a respective class of semantic information;
    selecting the candidate vector that, according to a distance criterion, best matches the vector of the values; and
    wherein the semantic information of the user is a function of the class of semantic information of the selected candidate vector.

4. The method according to claim 1, wherein the semantic classification process comprises:
    determining, from the vector of the values, level of busyness of the first user; and
    wherein the semantic information of the user further is a function of the level of busyness of the first user.

5. The method according to claim 1, wherein the displayed representation of the first user is rendered based on a model of the first user, and wherein the model is a function of parameters, the values of which are obtained at the first AR communication device.

6. The method according to claim 1, wherein the representation of the semantic information is any of: a graphical representation, a textual representation, or any combination thereof.

7. The method according to claim 6, wherein the representation of the semantic information is rendered on or beside the displayed representation of the first user.

8. The method according to claim 6, wherein the method further comprises one or both:
   determining, based on physical properties of the second user interface, how much other information is to be displayed at the second user interface, or user input from the second user, whether to render the representation of the semantic information as the graphical representation, the textual representation, or the combination thereof; and
   determining whether to render the representation of the semantic information on or beside the displayed representation of the first user.

9. The method according to claim 1, wherein the second user interface is configured also for displaying the representation of the second user, and wherein the representation of the second user is rendered based on the semantic information of the first user.

10. The method according to claim 1, wherein the displayed representation of the first user is an avatar, such as a three-dimensional avatar.

11. An Augmented Reality, AR, module for extracting semantic information from sensory data, the AR module being configured to be in communication with a first AR communication device to be worn by a first user and a second AR communication device to be worn by a second user, the first AR communication device comprising a first user interface for displaying a representation of the second user and the second AR communication device comprising a second user interface for displaying a representation of the first user, the AR module comprising processing circuitry, the processing circuitry being configured to cause the AR module to:
   obtain sensory data of the first user as captured by the first AR communication device, the sensory data comprising values of parameters and being represented by a vector of the values;
   determine, from the vector of the values, one or both of level of noisiness of the first user and level of privateness of the first user;
   extract semantic information of the first user from the sensory data by subjecting the sensory data to a semantic classification process, the semantic information of the user further being a function of one or both of the level of noisiness of the first user and the level of privateness of the first user; and
   provide the semantic information towards the second user interface for rendering a representation of the semantic information together with a displayed representation of the first user on the second user interface.

12. The AR module according to claim 11, wherein the sensory data comprises values of parameters, the parameters representing any of: gesture of the first user, pose of the first user, motion of the first user, activity of the first user, physical environment of the first user, crowdedness of the physical environment, sound level in vicinity of the first user, physical location of the first user, environmental classification of the physical location of the first user, or any combination thereof.

13. The AR module according to claim 11, wherein the sensory data comprises values of parameters and is represented by a vector of the values, and wherein the AR module is configured to, as part of performing the semantic classification process:
   compare the vector of the values to candidate vectors, wherein each of the candidate vectors represents a respective class of semantic information;
   select the candidate vector that, according to a distance criterion, best matches the vector of the values; and
   wherein the semantic information of the user is a function of the class of semantic information of the selected candidate vector.

14. The AR module according to claim 11, wherein the AR module is configured to, as part of performing the semantic classification process:
   determine, from the vector of the values, level of busyness of the first user; and
   wherein the semantic information of the user further is a function of the level of busyness of the first user.

15. The AR module according to claim 11, wherein the displayed representation of the first user is rendered based on a model of the first user, and wherein the model is a function of parameters, the values of which are obtained at the first AR communication device.

16. The AR module according to claim 11, wherein the representation of the semantic information is any of: a graphical representation, a textual representation, or any combination thereof.

17. The AR module according to claim 16, wherein the representation of the semantic information is rendered on or beside the displayed representation of the first user.

18. The AR module according to claim 16, wherein processing circuitry is configured to cause the AR module to one or both:
   determine, based on physical properties of the second user interface, how much other information is to be displayed at the second user interface, or user input from the second user, whether to render the representation of the semantic information as the graphical representation, the textual representation, or the combination thereof; and
   determine whether to render the representation of the semantic information on or beside the displayed representation of the first user.

19. The AR module according to claim 11, wherein the second user interface is configured also for displaying the representation of the second user, and wherein the representation of the second user is rendered based on the semantic information of the first user.

20. The AR module according to claim 11, wherein the displayed representation of the first user is an avatar, such as a three-dimensional avatar.

\* \* \* \* \*